Patented Aug. 1, 1933

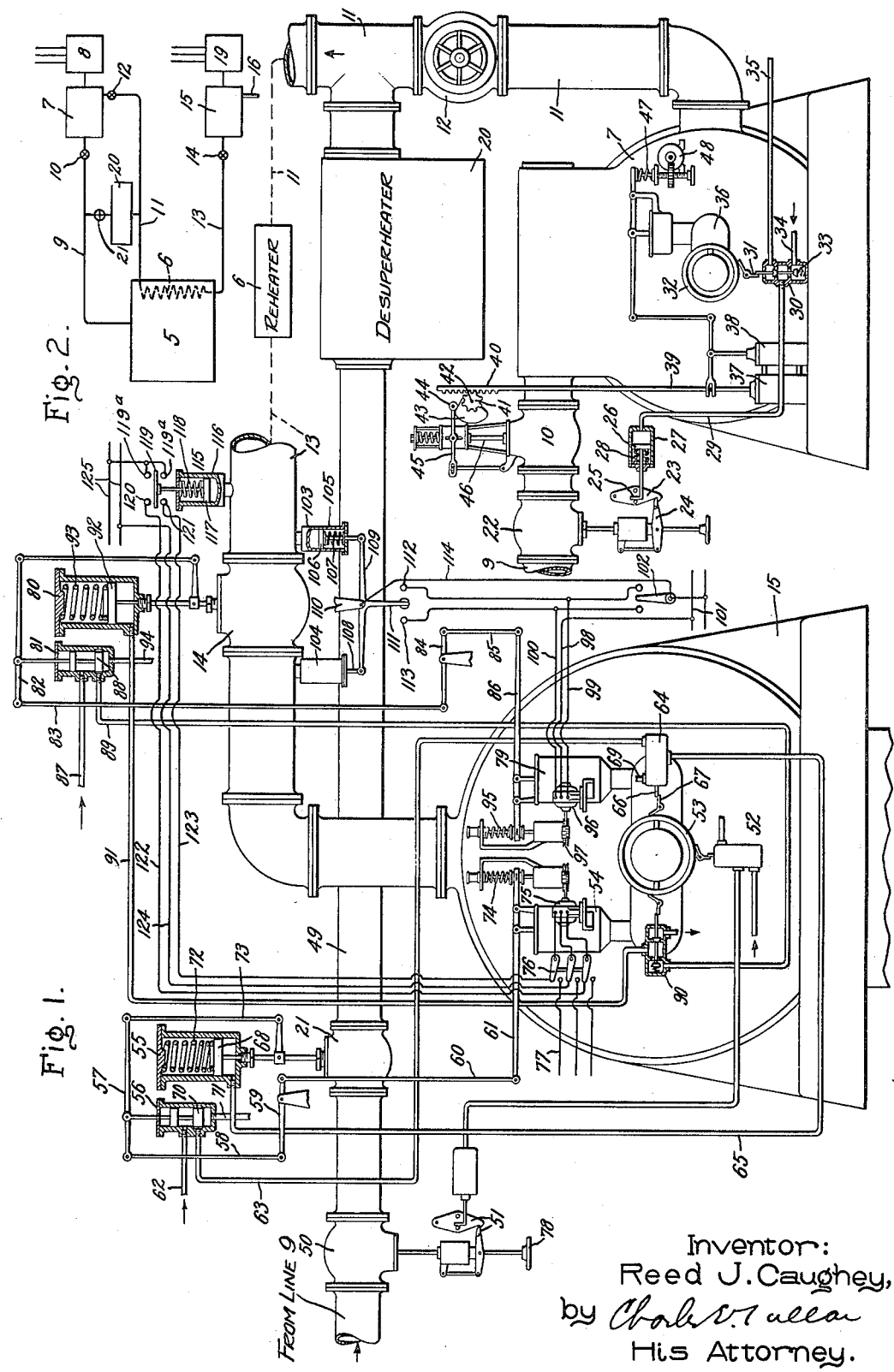

1,920,781

UNITED STATES PATENT OFFICE 1,920,781

POWER PLANT

Reed J. Caughey, Schenectady, N. Y., assignor to General Electric Company, a Corporation of New York Application April 28, 1932. Serial No. 608,025

5 Claims. (Cl. 60—102)

The present invention relates to power plants, more particularly to elastic fluid prime movers of the cross-compound type in which elastic fluid is supplied by an elastic fluid generator to a high pressure elastic fluid engine and from the exhaust thereof to a low pressure elastic fluid engine, both engines being provided on separate shafts. In plants of this type it occurs that the high pressure elastic fluid engine or a machine such as an electric generator driven thereby fails and has to be taken out of operation. In such case it is desirable to drive the low pressure unit which may comprise an elastic fluid engine and a generator driven thereby as an independent unit. For this purpose it is necessary to supply live elastic fluid directly to the low pressure engine and to provide a suitable regulating or governing mechanism for operating the individual units as independent units.

One object of my invention is to provide an improved regulating or governing mechanism for cross-compound and like elastic fluid engines whereby each part thereof, particularly a low pressure part thereof, may be driven as an independent unit.

Another object of my invention is to provide an improved circulation of the elastic fluid whereby damage to the reheater through which the elastic fluid passes in flowing from the high pressure unit to the low pressure unit is substantially prevented when the low pressure unit only is operated.

Still another object of my invention is to provide means for regulating the pressure and the flow of elastic fluid in the conduit means between the high and the low pressure units for preventing hunting of said low pressure unit due to the large amount of elastic fluid entrapped in the reheating line or lines.

Further objects will become apparent from a consideration of the following description and the claims appended thereto in connection with the drawing which forms a part of the specification.

Referring to the drawing, Fig. 1 shows by way of example a cross-compound turbine provided with a governing mechanism embodying my invention, and Fig. 2 is a diagrammatic view of a power plant provided with a cross-compound turbine as shown in Fig. 1.

Like parts in Figs. 1 and 2 are designated with the same reference characters.

Referring to Fig. 2, where I have shown by way of example a power plant including a cross-compound turbine embodying my invention, 5 designates an elastic fluid generator or boiler and 6 is a reheater built together with the elastic fluid generator 5 to form a single unit. The uniting of the elastic fluid generator and the reheater is sometimes necessary as a matter of efficiency or with respect to the available space. It is noted that the reheater in such an arrangement is always subject to heat and therefore proper care must be taken to prevent damage to the reheater in case little steam or like live elastic fluid flows therethrough. 7 represents the high pressure part of an elastic fluid engine, in the present instance a high pressure turbine, which is coupled with an electric generator 8. Turbine 7 is supplied with superheated elastic fluid, such as superheated steam in case of a steam turbine, from the boiler 5 through a line 9. 10 designates an admission valve for the turbine. The exhaust elastic fluid of turbine 7 is conveyed to reheater 6 through a line 11 in which a valve 12 is arranged. The elastic fluid after passing through reheater 6 is conveyed through a line 13 including a valve means 14 to a low pressure engine, in the present instance a low pressure turbine 15 having an exhaust indicated at 16 and driving an electric generator 19 connected to an electric line, not shown.

During normal operation the exhaust elastic fluid of the high pressure turbine is supplied through the reheater to the low pressure turbine. If the high pressure turbine 7 for any reason fails, the low pressure turbine may be operated by supplying live elastic fluid thereto. In order to provide for sufficient circulation through the reheater as long as the low pressure turbine is operating, the live elastic fluid is first passed through the reheater before being conveyed to the low pressure turbine. Excessive heating of the live elastic fluid in the reheater when only operating the low pressure turbine may be prevented by passing the live elastic fluid first through a de-superheater 20 provided between lines 9 and 11. 21 designates a valve means provided in the connection between de-superheater 20 and line 9. If with this arrangement the high pressure part 7 fails, valves 10 and 12 are closed and valve 21 is fully opened. Live elastic fluid then is supplied through line 9 to de-superheater 20 where it is de-superheated and from there through a part of line 11, through reheater 6 and line 13 to the low pressure turbine 15.

Referring to Fig. 1, where I have shown more in detail the cross-compound turbine diagrammatically indicated in Fig. 2 and the governor mechanism for operating it, the high pressure part of the turbine is indicated at 7. Live elastic fluid is supplied to this part through the conduit 9 including valve means 10 and the exhaust is passed through conduit 11 including valve means 12 to the reheater diagrammatically indicated at 6 and line 13 provided with an intercepting valve 14 to the low pressure part 15.

More in detail, in the high pressure conduit 9, is a combined trip and throttle valve 22 and the regulating valve 10, already mentioned. The combined trip and throttle valve is biased toward closed position and is normally held open by a latch means 23 engaging a finger 24. If the latch means 23 releases finger 24, valve 22 drops to closed position. This is a well known type of combined trip and throttle valve and is shown only diagrammatically in the drawing. Latch means 23 is adapted to be moved by hook 25 carried by a piston 26 which is movably arranged in a cylinder 27 and biased towards closing position of the throttle valve by a spring 28. The piston is normally held in the opening position, shown in the drawing, by oil under pressure supplied through pipe 29 connected to one end of the cylinder. The other end of pipe 29 is connected to a reversing valve 30, which is normally held in the position shown in the drawing by a trip finger 31 of an emergency governor 32 against the action of spring means 33. 34 designates a fluid supply pipe and 35 is a fluid discharge pipe. With the parts in the position shown in the drawing, fluid is supplied through pipe 34, reversing valve 30, pipe 29 to one end of cylinder 27. If the turbine speed reaches a certain predetermined value the emergency governor 32 causes trip finger 31 to move away from the end of the stem of valve 30, thereby permitting spring 33 to move the valve to reverse its position, to the effect that the supply of oil from pipe 34 is shut off and the oil pressure in cylinder 27 is relieved, the oil being drained off through discharge pipe 35. Piston 26 in cylinder 27 thereby moves to the right under action of spring means 28 and causes disengagement of latch means 23 and finger 24, thus permitting closing of valve 22. The combined trip and throttle valve shown is known and is more clearly described in Patent No. 1,471,316 to Dryer, October 16, 1923. Regulating valve 10 is controlled by a speed governor 36 through the intermediary of a fluid actuated motor 37 and a control means for the motor shown as a pilot valve 38. Piston stem 39 of the fluid actuated motor has an extension forming a rack 40, meshing with a gear 41 provided on a shaft 42. On the same shaft is provided a valve opening cam 43 having a cam surface engaging a roller 44 provided on one end of a fulcrumed lever 45. An intermediate point of the lever is connected to stem 46 of the regulating valve. The speed regulating mechanism shown is a known type of such mechanism and in operation an increase of speed causes governor 36 to actuate the control means or pilot valve 38 of motor 37 such that piston stem 39 moves upward and thereby effects through cam mechanism 43, 44 movement of the regulating valve towards closing position. 47 designates a synchronizing spring for adjusting the desired speed of the turbine. The adjusting of the spring may be performed in a known manner by a synchronizing motor shown at 48.

The low pressure turbine 15 is supplied with the reheated exhaust of the high pressure turbine as already mentioned through conduit 11, reheater 6 and conduit 13 when both turbines are operating. Live elastic fluid may be supplied to the low pressure part through conduit 13 if the high pressure part fails. In this case the steam before entering the reheater is passed through a conduit 49 including a de-superheater 20, Fig. 2. Provided in conduit 49 is a combined trip and throttle valve 50 similar to the combined trip and throttle valve 22 of the high pressure turbine and including a latch mechanism 51 corresponding to the latch mechanism 22, 23 of the high pressure turbine and a reversing valve 52 corresponding to the reversing valve 30 of the high pressure turbine. 53 designates an emergency governor which may be of the usual eccentric flyweight type for causing the reversing valve 52 to reverse its position when the speed of the turbine reaches a predetermined value.

Regulating valve 21 provided in conduit 49 behind trip and throttle valve 50 as regards the direction of flow of fluid is controlled by a governor 54 which is driven in suitable manner by the turbine shaft. Movement of valve 21 is accomplished through a motor 55 regulated by a control means or pilot valve 56 which in turn is moved through a lever mechanism comprising links 57, 58, 59, 60 and 61; lever 61 being connected to the speed governor. 62 represents a pipe for supplying oil under pressure to the pilot valve 56, and 63 is a pipe for supplying oil from the pilot valve through a reversing valve 64 and conduit 65 to motor 55. The reversing valve 64 is similar to reversing valve 52 of the low pressure turbine and reversing valve 30 of the high pressure turbine and permits displacement of oil between pilot valve 56 and motor 55 as long as the turbine is running below emergency speed. If, however, the turbine speed reaches emergency value the reversing valve is reversed, as in this case the emergency governor 53 causes disengagement of valve stem 66 and trip finger 67. This causes the oil below piston 68 of motor 55 being discharged through pipe 65, reversing valve 64, and discharge pipe 69 to a point, not shown.

The operation of governor 54 and the mechanism for moving valve 21 is as follows: Assume that the speed of the turbine increases, this causes a downward movement of the left-hand end of floating lever 61 and link 60, to the effect that the left-hand end of fulcrumed lever 59 is moved upward and causes through link 58 and floating lever 57 an upward movement of the pilot valve. The pilot valve head 70 thereby uncovers its port and permits oil being discharged from motor 55 through pipe 65, reversing valve 64, pipe 63 and a discharge pipe 71 of the pilot valve. Piston 68 of motor 55 is thereby moved downward under action of a spring 72 for biasing valve 21 towards closing position and thus moves valve 21 towards closing position. The downward movement of piston 68, through a follow-up mechanism including a link 73 connected to one end of floating lever 57, causes a similar downward movement of pilot valve head 70 whereby the latter assumes its original position. If the speed of the turbine decreases, similar movements of the mechanism take place but in opposite direction, to the effect that oil or like actuating fluid is supplied through pipe 62 of the pilot valve, pipe 63, through the reversing valve, to the lower part of the motor, and thereby causes the piston to move upward against the pressure of spring 72, to open valve 21. Provided on the right-hand end of floating lever 61 is a synchronizing spring 74 for adjusting the speed of the turbine. This is accomplished according to my invention by a synchronizing motor 75 connected through a double throw switch 76 to a line 77 leading to a station switch-board, not shown.

During normal operation, that is, when the low pressure turbine is supplied with exhaust from the high pressure turbine, trip and throttle valve 50 is closed. This may be performed manually by a hand wheel indicated at 78. Also, valve 21 during normal operation is preferably closed by properly setting the tension of synchronizing spring 74. Double contact switch 76 during normal operation is arranged to connect synchronizing motor 75 to lines 77 whereby this motor may be controlled from the switchboard. 79 designates a second speed governor for controlling intercepting valve 14 provided in conduit 13. The actuation of valve 14 by speed governor 79 is performed by a motor 80, similar to motor 55 for valve 21, and being controlled by a control means such as a pilot valve 81 which in turn is regulated by the speed governor through a lever mechanism including links 82, 83, 84, 85 and 86, the latter being connected to the speed governor. The pilot valve is provided with an oil supply conduit 87 and has a port normally covered by a valve head 88 and connected to a conduit 89 which in turn is connected through a reversing valve 90 and a conduit 91 to the lower part of the motor cylinder. The latter has a piston 92 with a stem connected to valve 14 and biased in downward direction by a spring 93.

The operation of this mechanism under normal operation of the cross-compound turbine is similar to that described with respect to speed governor 54 for regulating valve 21; that is, if the speed of the turbine increases, speed governor 79 causes downward movement of the right-hand end of floating lever 86 and link 85, clockwise turning of fulcrumed lever 84 whereby link 83 is moved upward and causes through floating lever 82 an upward movement of the pilot valve such that pilot valve head 88 uncovers its port and permits oil to be drained off from beneath piston 92 of the motor through pipe 91, reversing valve 90, pipe 89, through the pilot valve and a discharge conduit 94 of the latter. The draining of oil from beneath piston 92 causes the latter to move downward under action of spring 93 whereby intercepting valve 14 is moved towards closing position.

Governor 79 is provided with a synchronizing arrangement including a synchronizing spring 95 and a motor 96 for positioning or adjusting the spring through the intermediary of a worm gear 97. Motor 96 may be actuated from the station switchboard. For this purpose I provide lines 98, 99 and 100 connected to a source of supply 101, line 98 being connected directly to one pole of line 101 and lines 99 and 100 being connected through the intermediary of a double throw switch 102 to the other pole of the line. The synchronizing motor is of the reversing type so that the connection through line 98, 99 causes rotation in one direction and the connection through line 98, 100 to the source of supply causes rotation in the opposite direction.

According to my invention I provide means responsive to the flow of fluid through conduit 13 for actuating synchronizing motor 96 when the combined turbine or the low pressure turbine alone operates. The flow responsive device has been shown as comprising two pressure responsive means 103 and 104 connected to opposite sides of valve 14 and forming in substance a differential pressure responsive means. Each of the pressure responsive means comprises a cylinder 105 having a piston 106 movably arranged and biased against the fluid pressure in conduit 13 by a spring 107. The piston stems 108 are connected to the ends of a lever 109 fulcrumed at 110 and provided with a contact making device or member 111. 112 and 113 are contacts which may be engaged by the contact making device 111 for connecting lines 99 and 100 respectively with the other pole of the source of supply through line 114. During operation a change of flow of fluid causes the flow responsive device to connect either of lines 112 or 113 to the source of supply whereby the synchronizing motor is operated to adjust the synchronizing spring in such manner that it causes setting of valve 14 for a definite hydraulic resistance with respect to the flow of fluid through conduit 13. Thus, for instance, if the flow of fluid through conduit 13 decreases, the pressure difference between the inlet and outlet sides of valve 14 will decrease, more particularly, the pressure at the inlet side decreases more than that at the outlet side, to the effect that the piston of pressure responsive device 103 moves upward and the piston of pressure responsive device 104 moves downward under action of the biasing springs and thereby cause contact member 111 under counterclockwise turning of lever 109 to engage contact 112. This causes, in a well known manner, setting of the synchronizing spring 95 through motor 96 which in turn causes fluid-actuated motor 80 to move the valve towards opening position until the desired drop in pressure across valve 14 is obtained. The arrangement of a differential pressure regulator has the advantage that intercepting valve means 14 is always in a position ready to close within the shortest time possible which is important in case of an emergency condition, and at the same time causes a minimum resistance against the flow of fluid through conduit 13.

Another feature of my invention consists in providing a device responsive to pressure conditions in conduit 13 for actuating synchronizing motor 75 while the low pressure turbine is operated with live steam. In the present instance I have shown in the drawing a pressure responsive device 115 similar to pressure responsive devices 104 and 105 and including a cylinder 116 having one end connected to the conduit ahead of valve 14 as regards the direction of flow of fluid. 117 is a piston movable in the cylinder and having one side subjected to the fluid pressure in conduit 13 and its other side biased against this pressure by a spring means 118. The upper end of the piston stem may be provided with a contact-making member 119. 120 and 121 are contacts which are engaged by contact member 119 when the piston is moved up and downwardly respectively. These contacts are connected to synchronizing motor 75 through lines 122 and 123 respectively and through double-throw switch 76. 124 is a third line connected to the motor and the other end connected to one pole of a source of supply as indicated at 125, the other pole of this source of supply being connected to contacts 119ᵃ.

During operation, an increase in pressure causes the piston of pressure responsive device 115 to move upward against the pressure of the biasing spring 118 whereby contact-making member 119 overbridges contacts 120 and 119ª and thus connects the other pole of the electric source with line 122, to the effect that the synchronizing motor 75 is put into operation and rotates in a certain direction. If the pressure in conduit 13 decreases, it causes downward movement of the contact-making member 119 whereby the latter overbridges contacts 121 and 119ª and thus closes the circuit for synchronizing motor 75 whereby the latter rotates in the opposite direction as before. The operation of synchronizing motor 75 through the pressure responsive device 115 causes in a well known manner setting of synchronizing spring 74 which in turn causes positioning of valve 21 through the intermediary of fluid-actuated motor 55.

During normal operation, that is, when both turbines are operated, the pressure responsive device 115 is out of operation, double-throw switch 76 then being connected to line 77, as described above, and synchronizing motor 75 being operated from the switchboard. Respecting the source of supply 125 for motor 75, it is understood that line 77 may be connected to the same source through the switchboard, not shown.

In operation, when live steam is supplied to the low pressure turbine and the speed changes, due to a change of load, speed governor 54 causes setting of valve 21 as described above and speed governor 79 causes in a similar manner setting of valve 14. In other words, with respect to small load changes, valve 21 opens and shuts according to the demand for steam in the same proportion as the intercepting valve 14. However, if at constant speed of the turbine the load is changed by the switch-board operator by operating synchronizing motor 96, controlling operating governor 79 and intercepting valve 14, no movement of operating governor 54 and control valve 21 takes place. If the pressure in line 13 drops at constant turbine speed it causes a setting of synchronizing spring 74 of governor 54 through the pressure responsive device 115 in terms of pressure drop. If, due to this action, the rate of flow through conduit 13 changes, an actuation of the flow responsive device 103, 104 takes place to set synchronizing spring 95 of governor 79 in terms of the change of rate of flow.

In a similar manner, if the rate of flow changes, it causes setting of synchronizing spring 95 of governor 79 which in turn effects positioning of valve 14 to cause a definite pressure drop with respect to this valve. If thereby the pressure ahead of valve 14 changes, the pressure responsive device 115 causes setting of synchronizing spring 74 of governor 54 in terms of change of pressure in conduit 13.

What I claim as new and desire to secure by Letters Patent of the United States, is:—

1. In a cross-compound elastic-fluid engine including a high pressure and a low pressure engine, a conduit including a reheater for conveying exhaust of the high pressure engine to the low pressure engine, means for supplying live elastic fluid to the low pressure engine, said means including a second conduit and a desuperheater connected to the first-named conduit at a point ahead of the reheater as regards the direction of flow of fluid, valve means in the first-named conduit, intercepting valve means in the first named conduit provided near the inlet of the low pressure turbine for regulating the flow of fluid through the second conduit, speed-governing means driven by the low pressure turbine for controlling said valve means, and means for adjusting the speed-governing means in response to changes in flow of elastic fluid through the first named conduit.

2. In a cross-compound elastic-fluid turbine including a high pressure and a low pressure turbine, a conduit including a reheater for conveying exhaust of the high pressure turbine to the low pressure turbine, means for supplying live elastic fluid to the low pressure turbine, said means including a second conduit and a desuperheater connected to the first-named conduit at a point ahead of the reheater as regards the direction of flow of fluid, regulating valve means in the second conduit, a speed governor driven by the low pressure turbine for controlling the regulating valve means, a synchronizing motor for the speed governor, and means responsive to the pressure in the first-named conduit for operating the synchronizing motor.

3. In a cross-compound elastic-fluid turbine including a high pressure and a low pressure turbine, a conduit including a reheater for conveying exhaust of the high pressure turbine to the low pressure turbine, means for supplying live elastic fluid to the low pressure turbine, said means including a second conduit and a desuperheater connected to the first-named conduit at a point ahead of the reheater as regards the direction of flow of fluid, regulating valve means in the second conduit, a speed governor driven by the low pressure turbine for controlling the regulating valve means, a synchronizing motor for the speed governor, means responsive to the pressure in the first-named conduit for operating the synchronizing motor, an intercepting valve in the first-named conduit provided near the inlet to the turbine, another speed governor for moving the intercepting valve, another synchronizing motor for the other speed governor, and means for operating the other synchronizing motor in terms of rate of flow through the first-named conduit.

4. In a cross-compound elastic-fluid turbine including a high pressure and a low pressure turbine, a conduit including a reheater for conveying exhaust of the high pressure turbine to the low pressure turbine, means for supplying live elastic fluid to the low pressure turbine, said means including a second conduit and a desuperheater connected to the first-named conduit at a point ahead of the reheater as regards the direction of flow of fluid, a trip and throttle valve and regulating valve means in the second conduit, a speed governor for the regulating valve means, a synchronizing motor for the speed governor, means responsive to the pressure in the first-named conduit for operating the synchronizing motor, an intercepting valve in the first-named conduit provided near the inlet to the turbine, another speed governor for moving the intercepting valve, another synchronizing motor for the other speed governor, and a differential pressure regulator including pressure responsive devices connected to the first-named conduit ahead and behind the intercepting valve as regards the direction of flow of fluid for causing operation of the other synchronizing motor.

5. In a cross-compound elastic-fluid turbine including a high pressure and a low pressure turbine, a conduit including a reheater for conveying exhaust of the high pressure turbine to the low pressure turbine, means for supplying live elastic fluid to the low pressure turbine, said means including a second conduit and a desuperheater connected to the first-named conduit at a point ahead of the reheater as regards the direction of flow of fluid, a trip and throttle valve near the inlet to the second conduit, means for regulating the supply of live elastic fluid through the second conduit, said means including an intercepting valve in the first-named conduit provided near the inlet to the turbine, a speed governor for the intercepting valve, a synchronizing motor for the speed governor, a differential pressure responsive device with respect to the intercepting valve for actuating the synchronizing motor.

REED J. CAUGHEY.